United States Patent [19]

Goddin, Jr. et al.

[11] 4,180,554

[45] Dec. 25, 1979

[54] METHOD FOR REMOVAL OF SULFUR DEPOSITED ON A CLAUS CATALYST

[75] Inventors: Clifton S. Goddin, Jr.; John W. Palm, both of Tulsa, Okla.

[73] Assignee: Standard Oil Company (Indiana), Chicago, Ill.

[21] Appl. No.: 933,370

[22] Filed: Aug. 14, 1978

[51] Int. Cl.$^2$ ............................................. C01B 17/04
[52] U.S. Cl. ................. 423/574 R; 423/576; 252/411 S
[58] Field of Search .............. 423/573, 574, 576; 252/411 S

[56] References Cited

U.S. PATENT DOCUMENTS

| | | | |
|---|---|---|---|
| 2,561,990 | 7/1951 | Miller | 423/576 |
| 3,749,762 | 7/1973 | Montgomery | 423/574 |
| 4,035,474 | 7/1977 | Kunkel et al. | 423/576 |

FOREIGN PATENT DOCUMENTS

| | | | |
|---|---|---|---|
| 1448829 | 7/1966 | France | 252/411 S |
| 1444632 | 8/1976 | United Kingdom | 252/411 S |

*Primary Examiner*—G. O. Peters
*Attorney, Agent, or Firm*—Robert B. Stevenson; Arthur McIlroy

[57] ABSTRACT

An improved method of regenerating a low temperature Claus catalyst bed having elemental sulfur deposited on the catalyst involving initially using a moderately hot effluent gas (typically 600° to 650° F.) from the first conventional Claus reactor to warm up the low temperature Claus reactor and remove deposited sulfur and after the outlet temperature of said low temperature reactor reaches a value high enough to decompose COS and $CS_2$ (typically 600° to 650° F.), supplementing the moderately hot first conventional Claus reactor effluent gas with hot (typically 1000° to 1200° F.) waste heat boiler effluent such that the temperature of the regenerating catalyst bed can be elevated to about 700° F. or higher. The intentional temperature excursion to about 700° F. during catalyst regeneration improves the degree of regeneration of the catalyst bed, promotes higher catalyst activity and extends the catalyst life.

3 Claims, 1 Drawing Figure

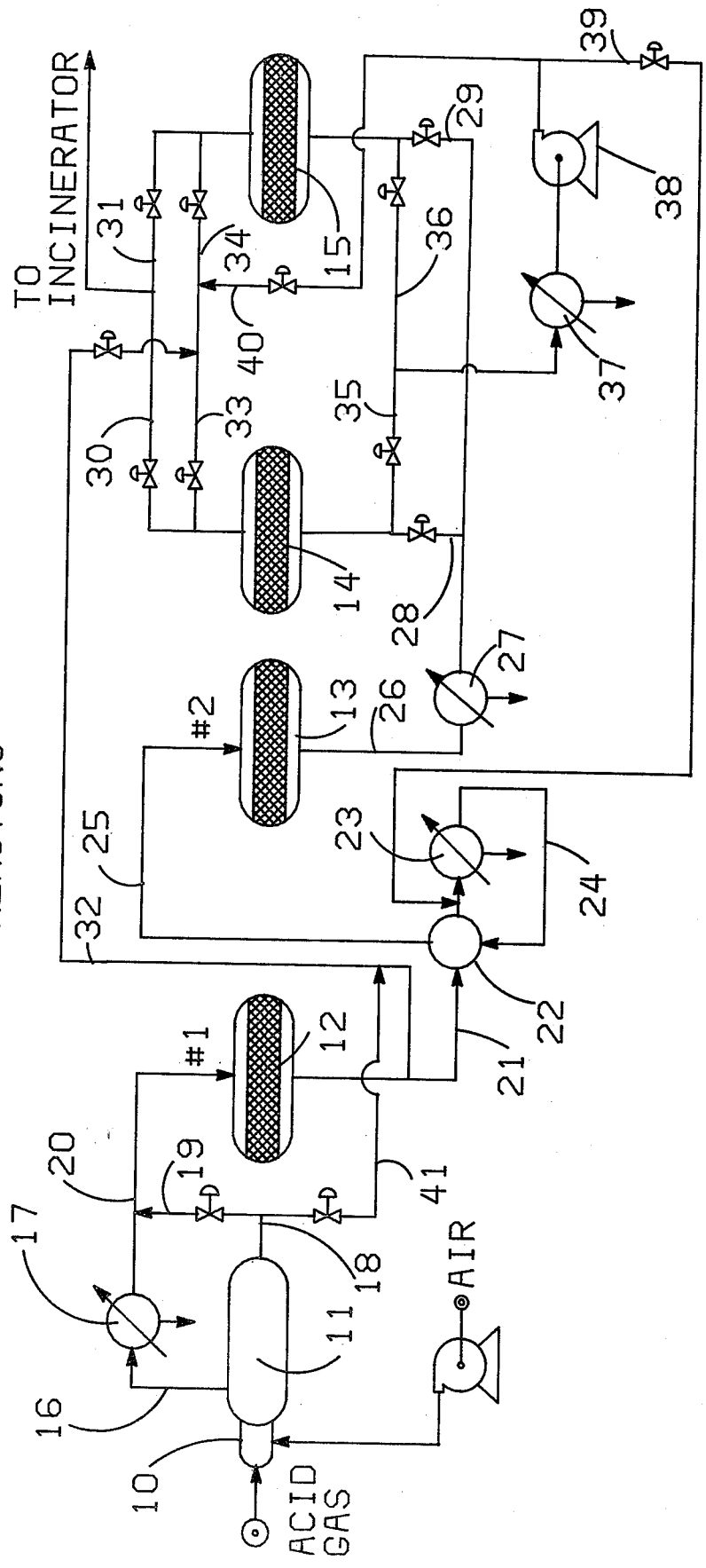

METHOD FOR REMOVAL OF SULFUR DEPOSITED ON A CLAUS CATALYST

BACKGROUND OF THE INVENTION

1. Field of the Invention

The present invention relates to an improved method for regenerating a catalytic reactor having sulfur deposited on the catalyst. More specifically, it is concerned with a dual temperature process for removing deposited sulfur, particularly in a sulfur recovery plant which employs a low temperature Claus reaction step with a periodic regeneration step, using hot indigenous streams wherein the temperature of the regenerating catalyst bed having once achieved a temperature high enough to promote the hydrolysis of $CS_2$ and COS is elevated to about 700° F.

2. Description of the Prior Art

Sulfur recovery plants convert hydrogen sulfide to sulfur by a process wherein a portion of the hydrogen sulfide is oxidized to produce a reaction mixture in which hydrogen sulfide and sulfur dioxide are present in a molar ratio of about 2:1, followed generally by two or more catalytic reaction steps in which hydrogen sulfide and sulfur dioxide are converted to sulfur by the Claus reaction. Additional details of the process include cooling the process stream to condense sulfur at appropriate points and reheating of the stream to the desired inlet temperature for each catalytic reaction step. One or more of the initial catalytic steps operate at a temperature which is above the sulfur dewpoint of the reacting gas, as has been practiced for decades. In a recent development to increase the sulfur recovery level, one or more of the final catalytic steps operate at a low termperature where sulfur is strongly adsorbed on the catalyst. This step is referred to as a "low temperature" Claus reaction step. As applied in the so-called Cold Bed Adsorption (CBA) process, typically as described in U.S. Pat. Nos. 3,702,884; 3,758,676; 3,749,762; and 4,035,474, the hydrogen sulfide and sulfur dioxide content of a conventional Claus plant effluent gas stream is decreased by conversion in a Claus type reactor operating at a temperature between about 270° and 300° F. At this lower than usual temperature level, sulfur is deposited on the catalyst which tends to decrease catalyst activity. The flow of the aforesaid dilute stream is periodically switched to a freshly regenerated reactor, and the first reactor in which sulfur has been adsorbed on the catalyst is regenerated by introducing a hot (600° to 650° F.) stream into the bed to vaporize the sulfur which is removed and sent to a condenser. After the catalyst has been regenerated in this fashion, it is cooled by flowing a suitable gas through it at a temperature ranging from about 250° to 300° F. until the catalyst bed itself reaches a temperature level within the aforesaid range. The adsorption cycle of a commercial scale plant typically would be about 18 to 24 hours, while the regeneration would take about 12-18 hours, followed by about 6-12 hours of cooling.

Various methods of accomplishing the overall low temperature Claus process, including the required regeneration and cooling of the catalyst bed, have been proposed. For example, in U.S. Pat. No. 3,702,884, a pair of low temperature reactors is used as an addition to a Claus plant wherein one of the added reactors is operated in the adsorption mode while the other is being regenerated and cooled in a recycle mode. Various arrangements for flow of regeneration effluent gas may be employed by one skilled in the art. The regeneration effluent may flow to a condenser and a blower to recycle the gas back to the appropriate point in the process. In U.S. Pat. No. 3,758,676 and U.S. Pat. No. 3,749,762, processes involving at least three catalytic reactors are disclosed wherein all three reactors are periodically changed from one mode to another, the modes generally comprising a conventional Claus reaction, a low temperature Claus reaction, or a regeneration and cooling mode. In both of these processes, the regeneration and cooling steps are accomplished by altering the relative positions of the reactors in the overall flow as well as controlling the temperature.

In U.S. Pat. No. 4,035,474, a regeneration technique is used wherein the same vessel always functions as the first Claus reactor, maintained at an elevated temperature sufficiently high to hydrolyze the COS and $CS_2$ present in the Claus furnace effluent. In order to insure that all of the furnace effluent (i.e., all of the COS and $CS_2$) experiences high temperature hydrolysis conditions, the indigenous stream for regeneration is obtained by withdrawing a portion of the effluent from the intentionally hot first Claus reactor. In this manner, ultimate emissions of sulfur to the atmosphere caused by the presence of COS and $CS_2$ are minimized. In view of the contemporary emission standards, the COS and $CS_2$ presence can be critical even though their presence amounts to a relatively small portion of the total sulfur. In fact, all of the above processes, when properly designed and engineered, can achieve as high as 99% removal of total sulfur. The high temperature hydrolysis of COS and $CS_2$ is an essential element in any sulfur recovery method that is intended to meet contemporary emission standards; however, the use of a hot first Claus reactor, as suggested in U.S. Pat. No. 4,035,474, to process all of the Claus furnace effluent has certain inherent limitations. For example, as is recognized in the art, the primary purpose for the Claus reactor is to catalytically convert $H_2S$ and $SO_2$ to elemental sulfur and water. This process involves a reversible exothermic reaction which inherently means that higher temperature shifts the equilibrium concentrations such as to favor the reactants rather than the products, or conversely, lower temperature favors conversion to sulfur and thus higher sulfur recovery. Therefore, the selection of an operating temperature for the first Claus reactor is a tradeoff between the desired decomposition of minor components while still maintaining a high level of conversion of $H_2S$ and $SO_2$ to elemental sulfur by the Claus reaction.

SUMMARY OF THE INVENTION

In accordance with this invention, there is provided a method for regenerating a catalytic reactor having sulfur deposited on the catalyst by vaporization of deposited sulfur using a portion of the hot gaseous stream from the first Claus reactor supplemented by a very hot gaseous stream from the waste heat boiler. Initially, the hot effluent from the first or lead Claus catalytic reactor is introduced into the sulfur-fouled reactor to be regenerated. This gradually raises the temperature of the catalyst bed and partially removes the deposited sulfur. Having achieved a temperature of about 600° to 650° F. on the outlet gas from the regenerating reactor, the introduction of a very hot gaseous stream withdrawn from the waste heat boiler is commenced such that further sulfur removal takes place and the temperature of the catalyst is elevated to about 700° F. The exact temperature to which the catalyst is elevated may vary in the range of about 650° to 800° F., recognizing that the higher temperature will result in faster and more complete regeneration of the catalyst.

Such a dual temperature regeneration process is consistent with the overall optimization of the sulfur recovery process in that it simultaneously allows the first Claus reactor to be operated at the lowest possible temperature which will accomplish the desired hydrolysis of COS and $CS_2$ and yet still achieve the desired ultra-high temperatures in the reactor being regenerated. By waiting until the regenerating reactor has reached a temperature of about 600° to 650° F. before introducing the very hot gaseous slipstream from the waste heat boiler, the COS and $CS_2$ in this stream will be subjected to a temperature sufficient to result in virtually complete hydrolysis. Thus, sulfur emission associated with the presence of these minor components in the slipstream is minimized. This method also insures that the regenerating catalyst bed will be elevated to temperatures of about 700° F. or higher during regeneration. These temperatures are easily achieved in that the gaseous slipstream can be withdrawn from the waste heat boiler at temperatures in the range of 1000° to 1200° F. in a manner analogous to what has previously been referred to in the literature as "bypass reheating" (commonly involving withdrawing a gaseous stream after the first pass through a two-pass waste heat boiler). The primary incentive for achieving a high temperature excursion during the regeneration step is that the regenerating catalyst bed will exhibit improved catalytic activity for a much longer life span.

Further according to this invention, a method is provided for withdrawing a portion of the gaseous stream within the waste heat boiler located upstream to the first or lead Claus reactor during the time when the sulfur-fouled reactor is being regenerated by the use of hot effluent from the first Claus reactor and introducing this gaseous stream from the waste heat boiler into the regenerating CBA reactor to further heat and remove the deposited sulfur. Such a method is particularly useful in a sulfur recovery plant that undergoes major fluctuation in the amount of acid gas being processed. During periods in which the amount of $H_2S$-containing gas being processed drops to a small percentage of the nameplate capacity of the plant, the addition of waste heat boiler gas to the regenerating CBA reactor can be advantageous in that it insures sufficient heat to accomplish the desired sulfur within the cycle time available.

BRIEF DESCRIPTION OF THE DRAWING

The drawing is a simplified flow diagram showing how the present invention is incorporated into a conventional Claus sulfur recovery plant employing a furnace, two conventional Claus reactors in series, and a final pair of low temperature Claus reactors.

DESCRIPTION OF THE PREFERRED EMBODIMENTS

The improved method for regenerating a Claus catayst bed having elemental sulfur deposited on the catalyst and how this improvement is incorporated into the overall process can be explained and understood by reference to the accompanying drawing.

The drawing is a simplified flow diagram which illustrates a typical commercial scale Claus plant involving a furnace 10 followed by a waste heat boiler 11, a pair of conventional Claus reactors 12 and 13 in series and a pair of interchangeable, low temperature Claus reactors 14 and 15, one of which will be operating in the on-stream mode while the other is being regenerated. The acid gas containing the $H_2S$ enters the Claus furnace 10 along with sufficient air to convert approximately one-third of the $H_2S$ to $SO_2$, thus forming the proper stoichiometric ratio of reactants for the Claus reaction. The effluent from the Claus furnace 10 enters waste heat boiler 11 wherein the heat of reaction is partially removed by cooling the gaseous stream to about 1000°–1200° F. during the first pass through the waste heat boiler and approximately 500°–600° F. after two passes. The major portion of the waste heat boiler effluent exits waste heat boiler 11 through line 16 and then passes through sulfur condenser 17. As taught in the prior art, a minor portion of the gaseous stream in waste heat boiler 11 is withdrawn through line 18 and is then combined, via valved line 19, with the effluent from the sulfur condenser 17 before entering the first conventional Claus reactor 12 via line 20. In this manner, the effluent from the sulfur condenser 17 is reheated such that the temperature in the first Claus reactor 12 is maintained sufficiently high that most of the COS and $CS_2$ formed in the furnace is hydrolyzed. The effluent from the first Claus reactor is then directed to the second conventional Claus reactor 13 via line 21, heat exchanger 22, sulfur condenser 23, line 24, second pass through other side of heat exchanger 22, and line 25. Within the second Claus reactor 13, further catalytic conversion of $H_2S$ and $SO_2$ to sulfur and water takes place with the reactor effluent exiting through line 26. This effluent is directed to condenser 27 for further liquid sulfur recovery. The gaseous stream from condenser 27 goes to either low temperature Claus reactor 14 or 15 via valved line 28 or 29, respectively, depending on which reactor is operating in the adsorption mode while the other one is being regenerated. This final effluent from the adsorption mode low temperature Claus reactor is then sent to the incinerator via valved line 30 or 31 before being released to the atmosphere. The regeneration of the sulfur laden, low temperature Claus reactor is accomplished by withdrawing a portion of the first Claus reactor effluent through valved line 32 and directing the hot effluent to either low temperature reactor 14 or 15, respectively, via valved line 33 or 34. As the hot gases pass through the regenerating reactor, the adsorbed sulfur is vaporized and flows via valved line 35 or 36 to sulfur condenser 37, blower 38, and valved line 39, and thence to a point upstream from the second conventional Claus reactor 13. Having removed the deposited sulfur, the valve in line 40 is opened and the valves in lines 32 and 39 are closed such that recycle cooling of the regenerated catalyst bed takes place. Up to this point, this description is equivalent to what has been published in the prior art. For more details, see U.S. Pat. No. 4,035,474 herein incorporated by reference.

In order to practice the present invention, the above-described commercial embodiment is supplemented with a valved line 41 which allows the plant operator to withdraw a very hot gaseous stream from the waste heat boiler 11 and deliver the stream to the regenerating reactor 14 or 15 via valved line 32 containing the hot regeneration gas.

In practicing the present improvement, the reactor being regenerated initially will be at a temperature below the sulfur dewpoint of the gas, typically between about 260° and 300° F. Initially, the valve in line 41 will remain closed, while the valve in line 32 is opened. Consequently, the first portion of the regeneration cycle will be analogous to what has previously been the accepted method of removal of deposited sulfur, i.e., by the use of effluent from the first conventional Claus reactor 12. As the sulfur removal continues, the outlet temperature of the regenerating bed increases. Having once achieved an outlet temperature of about 600°–650° F., the valve in line 41 can be opened, thus allowing very hot waste heat boiler bypass gas to commingle with the hot effluent from the first conventional Claus reactor. The amount of such very hot gas will be controlled so that the temperature of the regenerating gas being employed in this latter stage of the sulfur removal will be about 700° F. or higher, a temperature level higher than what has been previously suggested and practiced commercially. The addition of waste heat boiler bypass gas through line 41 is continued until a temperature of about 700° F. or higher is achieved throughout the regenerating catalyst bed. When the regeneration step is completed, the valve in line 41 can be closed and the cooling of the regenerated bed can commence. The cooling can either be by closing of the valves in lines 41 and 32 at substantially the same time or the temperature can be brought back down in stages by leaving the valve in line 32 open after closing the valve in line 41 until the temperature of the bed again approaches the first conventional Claus effluent temperature whereupon the conventional cooling begins.

The specific position of valved line 41 can vary according to the anticipated needs of the particular plant. In any event, the operation is essentially equivalent with the coordinated opening and closing of valves in lines 41 and 32 being responsible for the controlled sequential temperature rise during regeneration; furthermore, the valve in line 41 can be utilized to supply heat energy needed to regenerate the reactors during periods of severe turndown. This is accomplished in an analogous manner by monitoring the temperature and opening the valve in line 41 whenever additional heat energy is required.

Various arrangements of waste heat boiler 11 and condenser 17 may be used. For example, a two-pass waste heat boiler, as shown, may be used, or a single-pass waste heat boiler may be employed with a portion of the effluent going through line 18 and the remainder going through line 16 to condenser 16. Another common arrangement is to combine the waste heat boiler 11 in the same shell as condenser 17. Condensers 23 and also 27 may be combined in the shell with waste heat boiler 11 and condenser 17 if desired.

Although the waste heat boiler is generally designed to produce an effluent stream in line 18 with a temperature in the range of about 800° F. to 1200° F., our invention is not limited to this range. Higher temperatures may be used if suitable construction materials for line 18 and valved lines 19 and 41 are provided.

Although a waste heat boiler generating steam is generally used, any other method can be used to provide cooling of the furnace 10 effluent to the desired temperature to furnish the hot gas which flows through valved line 41.

Similarly, our invention is not limited to use of hot reheat gas from a waste heat boiler. The gas flowing from condenser 17 through line 20 to conventional Claus reactor 12 may be reheated by any desired method. Examples would include an inline burner in which acid gas or a suitable fuel gas is burned with air, with the reactor feed gas to be heated being mixed with the burner effluent gas. The same methods may be used to provide the hot gas in valved line 41.

By implementing the present invention, certain specific overall advantages are obtained. As previously mentioned, the present improvement is consistent with operating the first reactor at the lowest temperature that will accomplish an acceptable degree of hydrolysis of COS and $CS_2$, thus maximizing the amount of sulfur recovery by virtue of the Claus reaction occurring within this first reactor. Thus, the overall conversion efficiency of the first conventional Claus reactor is optimized. Also, according to the present invention, the total furnace effluent will experience catalytic conditions favoring hydrolysis of COS and $CS_2$. More important, the temperature excursion to about 700° F. or higher has the positive effect of providing a regenerated catalyst that exhibits improved sulfur conversion over a much longer lifetime relative to the same catalyst regenerated at a lower temperature.

Controlled laboratory experiments intended to simulate the adsorption, regeneration and cooling cycles characteristic of a commercial, low temperature Claus reactor show that, for both a bauxite catalyst as well as an alumina catalyst subjected to a 24-hour cycle (12 hours on adsorption followed by 12 hours on regeneration-cooling) for approximately 190 days, the level of conversion of feed gas reactants to sulfur is sensitive to the temperature achieved during regeneration. In both experimental runs, 85 days of sulfur conversion in excess of 90% were maintained with a 700° F. regeneration temperature, but within 15 days after reducing the regeneration temperature to 600° F. the conversion dropped to a level of 80% and below. Surprisingly, reestablishing the 700° F. regeneration temperature on approximately the 99th day restored the conversion level to the previous 90% and above value. A second 600° F. regeneration period at about 120 days again resulted in a drop in sulfur conversion level. Raising the temperature for regeneration to 650° F. at the 141st day at best arrested the drop but did not restore the catalyst activity. Raising the regeneration temperature to 700° F. after 155 days again restored the high conversion level. Thus, regeneration temperatures below 650° F. were unacceptable in these tests. A regeneration temperature of 700° F. or higher provided higher sulfur conversion levels with a longer effective lifetime of the catalyst. As an additional pragmatic consideration, the higher regeneration temperatures result in more rapid and more complete sulfur removal, thus increasing the effective capacity of a given low temperature Claus reactor.

Having thus described the preferred embodiments and the advantages of the present improvements, it should be apparent to one skilled in the art of designing and operating sulfur recovery units that a great number of modifications and details in the foregoing procedure may be made without departing from the scope of our invention. Further, the present high temperature excursion during regeneration is viewed as being consistent with other contemporary concerns during regeneration such as maintaining an environment conducive to minimizing catalyst sulfation, proper hydration of the regenerated catalyst, and the like. As such, this disclosure and associated claims should not be interpreted as being unduly limiting.

We claim:

1. In a process for removal of sulfur from a gaseous stream containing hydrogen sulfide involving first recovering sulfur noncatalytically by burning said gaseous stream in a furnace followed by a waste heat boiler, and then further recovering sulfur catalytically by passing the effluent from the waste heat boiler through a series of Claus reactors with associated liquid sulfur condensers wherein one or more of the lead Claus reactors is operated in a so-called conventional temperature range which is higher than the sulfur dewpoint of the reacting gas and one or more of the following Claus reactors operates in a lower temperature range in which sulfur is strongly adsorbed on the catalyst, and wherein the temperature of the first Claus reactor is maintained sufficiently high to hydrolyze COS and $CS_2$ and wherein the resulting effluent from the final conventional Claus reactor passes through a low temperature Claus step involving at least two interchangeable reactors, and wherein said conventional Claus effluent at all times passes through at least one of said interchangeable, low temperature reactors to further convert the reactants and condense the sulfur for an interval during which the other said interchangeable, low temperature reactor catalyst is regenerated by vaporization of the deposited sulfur followed by cooling of the sulfur-denuded catalyst, the improvement comprising:

introducing initially into said interchangeable, low temperature Claus reactor about to be regenerated by removal of deposited sulfur a portion of the gaseous effluent from said first Claus reactor at a temperature of about 600° to 650° F. such as to heat the low temperature Claus catalyst and remove said deposited sulfur, and then having raised the temperature of said catalyst to about 600° to 650° F. introducing a hot gaseous stream into said interchangeable, low-temperature Claus reactor being regenerated such as to elevate the temperature of said regenerating catalyst bed to a value of about 700° F. prior to cooling and returning said interchangeable, low temperature Claus reactor to the adsorption mode.

2. A process according to claim 1 wherein said hot gaseous stream to be introduced into said interchangeable, low-temperature Claus reactor after said catalyst therein has been heated to about 600° to 650° F. is withdrawn from said waste heat boiler.

3. In a process for regenerating a low temperature Claus catalytic reactor having sulfur deposited on the catalyst including the steps of removing said deposited sulfur by contacting said catalyst with a hot gas from the lead conventional Claus reactor upstream from said low temperature Claus catalytic reactor, thus heating said low temperature Claus catalytic reactor to about 600° to 650° F., the improvement comprising:

Withdrawing a portion of the gaseous stream from a cooling pass of the waste heat boiler upstream of said conventional Claus reactor and introducing said gaseous portion from the waste heat boiler into the gaseous effluent from said lead conventional Claus reactor entering said low temperature Claus catalytic reactor to regenerate said low temperature Claus reactor catalyst by removal of deposited sulfur prior to cooling and returning said low temperature Claus reactor to the absorption mode.

* * * * *